O. E. MICHAUD.
ANTIFRICTION BEARING.
APPLICATION FILED MAR. 6, 1915.
1,165,434.
Patented Dec. 28, 1915.
2 SHEETS—SHEET 1.
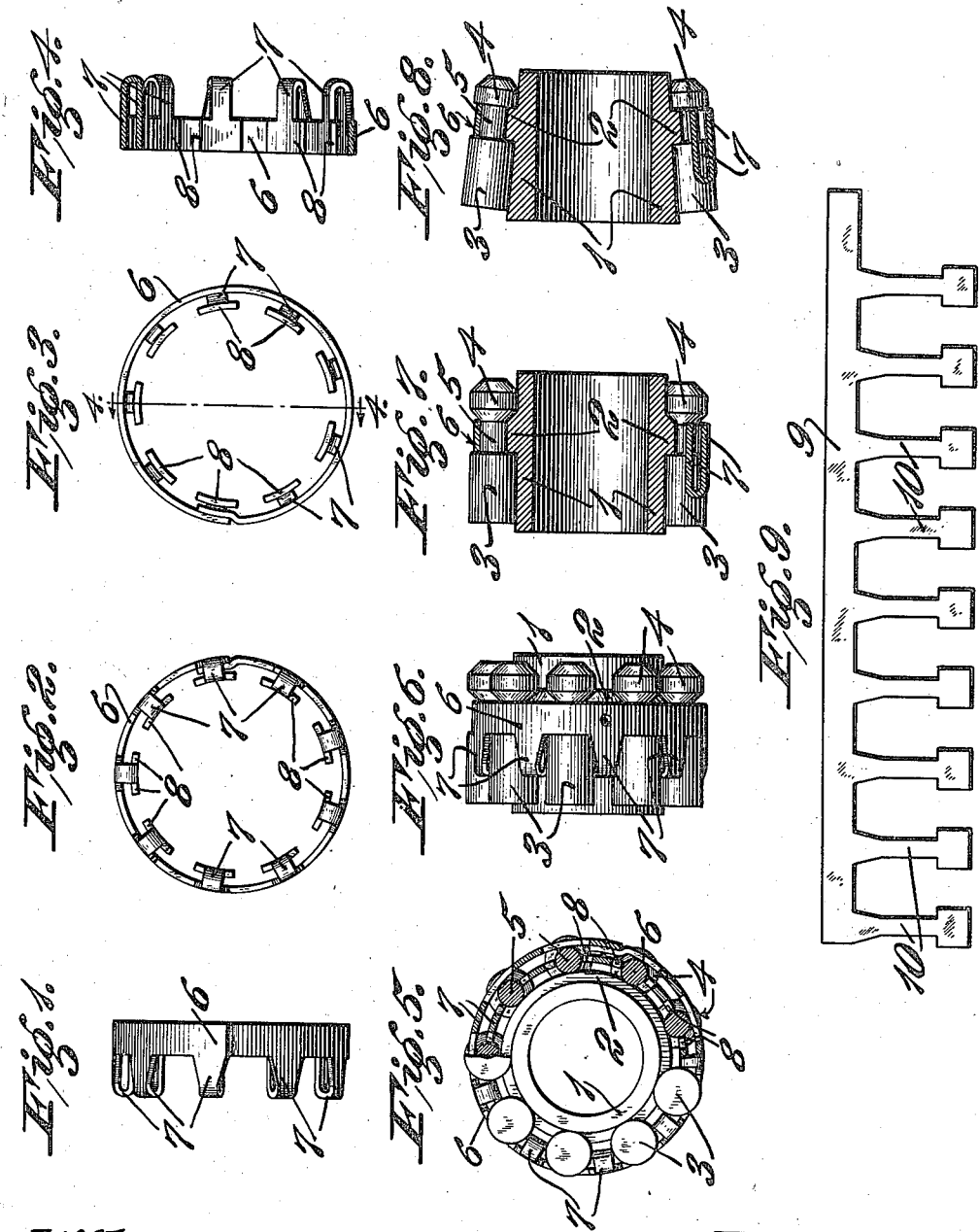

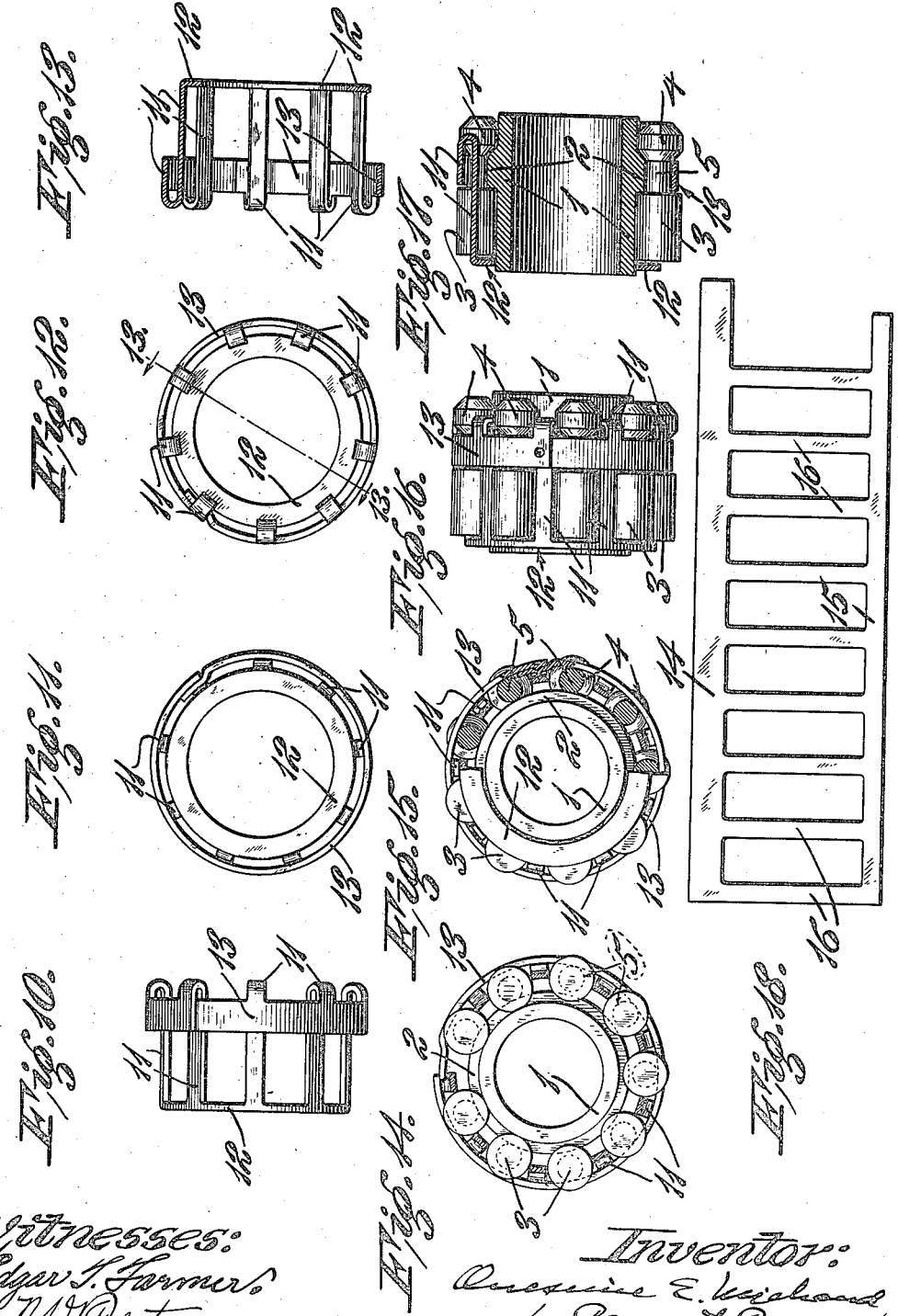

UNITED STATES PATENT OFFICE.

ONESIME E. MICHAUD, OF ST. LOUIS, MISSOURI.

ANTIFRICTION-BEARING.

1,165,434.　　　　　Specification of Letters Patent.　　Patented Dec. 28, 1915.

Application filed March 6, 1915. Serial No. 12,491.

*To all whom it may concern:*

Be it known that I, ONESIME E. MICHAUD, a citizen of the United States, and a resident of the city of St. Louis and State of Missouri, have invented a new and useful Improvement in Antifriction-Bearings, of which the following is a specification.

This invention relates to antifriction bearings of the type wherein a series of cylindrical or conical rollers are spaced circumferentially between inner and outer concentric bearing rings.

The invention relates more particularly to a cage or retaining member for retaining the bearing rollers, having necks of reduced diameter between their ends, in assembled relation on the inner bearing ring and in alinement at fixed distances apart.

One object of the invention is an improved retaining member for roller bearings which will positively hold bearing rollers, having necks of reduced diameter between their ends, in place on an inner bearing ring and in alinement at fixed distances apart without cramping or binding the bearing rollers.

A further object of the invention is an improved retaining member for roller bearings which can be cheaply made from a single piece of sheet metal.

A still further object of the invention is a combined radial and thrust bearing in which bearing rollers having necks of reduced diameter between their ends are held in assembled relation on an inner bearing ring by a retaining member which can be cheaply made of sheet metal.

Further objects of the invention relate to improvements in the construction of antifriction bearings and retaining members therefor, said improvements being more fully pointed out hereinafter.

Generally stated, the invention consists in a retaining member of sheet metal having a band encircling the rollers of the bearing and holding them in place upon the inner bearing ring, said band having spacing members integral therewith which are arranged between the rollers to hold them in alinement.

The invention further consists in the parts, and in the arrangements and combinations of parts, more fully set forth hereinafter.

In the accompanying drawings in which like reference characters refer to like parts in the several views, Figure 1 is a side view of a retaining member for roller bearings embodying the invention; Fig. 2 is an end view of the retaining member shown in Fig. 1, said view showing the left-hand end of the retaining member as shown in Fig. 1; Fig. 3 is a view of the end of the retaining member opposite to the end shown in Fig. 2; Fig. 4 is a diametrical section of the retaining member on the line 4—4 in Fig. 3; Fig. 5 is an end view, partly in section, of the inner bearing ring, bearing rollers and retaining member assembled; Fig. 6 is a side view of the inner bearing ring, bearing rollers and retaining members assembled; Fig. 7 is a diametrical section through the inner bearing ring, bearing rollers and retaining member assembled; Fig. 8 is a section similar to Fig. 7 showing a retaining member for tapered bearing rollers; Fig. 9 is a view of the blank from which the retaining member is made; Fig. 10 is a side view of a retaining member of modified construction; Fig. 11 is an end view of the retaining member shown in Fig. 10, said view showing the left hand end of the retaining member as shown in Fig. 10; Fig. 12 is an end view of the retaining member shown in Fig. 10 showing the end thereof opposite to the end shown in Fig. 11; Fig. 13 is a diametrical section through the retaining member, said section being taken on the line 13—13 in Fig. 12; Fig. 14 is an end view of the inner bearing ring, the bearing rollers and the modified form of retaining member partly assembled; Fig. 15 is an end view, partly in section, showing the inner bearing ring, the bearing rollers and the modified form of retaining member assembled; Fig. 16 is a side view, showing the inner bearing ring, the bearing rollers and the modified form of retaining member assembled; Fig. 17 is a diametrical section through the inner bearing ring, bearing rollers and the modified form of retaining member assembled; and Fig. 18 is a view of the blank from which the retaining member shown in Figs. 10 to 13 is made.

Referring to the accompanying drawings, the inner bearing ring 1 of the roller bearing has an exterior circumferential ridge 2, one edge of which is beveled. Each of the bearing rollers comprises a cylindrical portion 3 and a head 4 connected by a neck 5 of reduced diameter. The inner circumferential edge of the head 4 of each bearing roller is beveled to coöperate with the beveled edge of the ridge 2 of the inner bearing ring 1. The outer circumferential edge of the head 4 of each bearing roller is also beveled to coöperate with a beveled face of an outer bearing ring (not shown).

The preferred construction of the retaining member, shown in Figs. 1 to 7, comprises a circular band 6 from one edge of which projects a plurality of spacing members 7. These spacing members 7 are located at equal intervals throughout the length of the band 6, corresponding to the size and the spacing of the bearing rollers. Each spacing member 7 extends laterally from the band 6, then radially inward, and then backward under said band; or, in other words, the free end portions of the spacing members 7 are doubled under the band 6. The end portion of each spacing member 7 which is doubled under the band 6 has lateral wings 8 formed integral therewith, one of said wings projecting from each longitudinal edge of said spacing member. The wings 8 are substantially as wide as the band 6.

The retaining member is preferably made from a single piece of sheet metal by simple operations of stamping and bending. The piece of sheet metal is first stamped into a blank (see Fig. 9) which comprises a strip 9, corresponding to the band 6 of the finished retaining member. Integral with the strip 9 of the blank are equally spaced tongues 10 which project from one edge of said strip 9 at right angles. The tongues 10 correspond to the spacing members 7 of the finished retaining member and have at their outer ends laterally projecting wings corresponding to the wings 8 of the finished retaining member. The tongues 10 of the blank are doubled back over the strip 9, and then the blank is rolled into a cylindrical or conical form, depending on the type of the bearing with which the retaining member is to be used. The end portions of the strip 9, which are the end portions of the band 6 of the finished retaining member, are overlapped, one end portion being offset (see Figs. 2 and 3).

In assembling the retaining member and the bearing rollers on the inner bearing ring, the bearing rollers are fitted into the spaces between the spacing members 7 of the retaining member, the necks of said bearing rollers fitting between the wings 8 of said spacing members and bearing against the band 6 of said retaining member. The inner bearing ring 1 is forced into place inside of the bearing rollers, the retaining member being resilient and expanding sufficiently to permit the heads 4 of the bearing rollers to pass over the ridge 2 of the inner bearing ring 1. The overlapped end portions of the band 6 are suitably secured together, preferably by a prong or indentation punched from one end portion into the other (see Figs. 5 and 6).

In Fig. 8 is shown a retaining member for a roller bearing in which tapered bearing rollers are used. The construction of the retaining member is the same as shown in Figs. 1 to 7 and hereinbefore described, except that the spacing members 7 are arranged in a conical surface instead of in a cylindrical surface.

In the modified construction shown in Figs. 10 to 17 the spacing members 11 are substantially uniform in width and are integrally connected at one end by an annular flange 12 and at the other end by a circular band 13. These spacing members 11 extend substantially the full length of the bearing rollers, and near the end of the retaining member adjacent to the band 13 said spacing members extend radially outward, then backward to the circular band 13. The end portions of the band 13 are overlapped, and after the retaining member and the bearings rollers have been assembled on the inner bearing ring, said end portions are fastened together in the same way as hereinbefore described.

The modified form of the retaining member is also preferably made from a single piece of sheet metal, stamped into a blank (see Fig. 18) which comprises two longitudinally parallel strips 14 and 15, which correspond to the band 13 and the annular flange 12 of the finished retaining member. These strips 14 and 15 are connected at intervals by narrow strips 16, which correspond to the spacing members 11 of the finished retaining member. The longitudinal edge portion of the blank adjacent to the wider strip 14 is doubled over the remainder of the blank; and the other longitudinal edge portion 15 of the blank is bent at right angles to the plane thereof to form the flange 12 of the finished retaining member. After the edge portions of the blank have been bent as hereinbefore described, the blank is rolled into a cylindrical or conical shape, and the ends of the strip 15, which correspond to the ends of the flange 12 of the finished retaining member, are welded together. The bearing rollers and the retaining member are assembled on the inner bearing ring in the same way as hereinbefore described, and after the parts have been assembled, the end portions of the band 13 are pinched together and indented by a suitable tool or appliance.

In each of the constructions shown and hereinbefore described, after the parts have been assembled, the inner portions of the spacing members are located at the same distance from the center of the inner bearing ring as the axis of the bearing rollers, so that the bearing rollers touch the spacing members substantially in line with the direction of movement of the axes of said rollers. The band of the retaining member in each of the constructions encircles the bearing rollers and positively prevents them from moving outwardly from the inner bearing ring. The cylindrical portion 3 and the head 4 of each bearing roller straddle the ridge 2 of the inner bearing ring 1 and prevent the roller from slipping endwise. The band of the retaining member encircles closely the necks 5 of the bearing rollers and is thereby held against movement lengthwise of the rollers. In the preferred construction, the spacing members 7 engage the cylindrical portions 3 and the necks 5 of the bearing rollers and hold said bearing rollers in alinement. In the modified construction, the spacing members 11 engage the rollers for approximately the entire length thereof and thereby hold said bearing rollers in alinement. The retaining member can be made from a single piece of sheet metal by simple punching and bending operations.

The constructions shown and hereinbefore described may be considerably changed without departing from the invention and I do not wish to be restricted to the details of these constructions shown and described.

I claim the following as my invention:

1. A retaining member for roller bearings comprising a circular band and a plurality of spacing members integral at one end with said band, portions of said spacing members being arranged inside of said band and spaced therefrom.

2. A retaining member for roller bearings comprising a circular band and a plurality of spacing members integral at one end with said band, portions of said spacing members being arranged in a circular series inside of said band, and the end portions of said band being overlapped and detachably fastened together.

3. A retaining member for roller bearings in the form of an annular shell comprising a strip of sheet metal having a band and a series of spacing members integral with said band, said band encircling said series of spacing members, and the end portions of said band being overlapped and detachably secured together.

4. A retaining member for roller bearings comprising a circular band and a plurality of spacing members integral at one end with said band, portions of said spacing members being arranged in a circular series inside of the band and having lateral wings integral therewith.

5. A retaining member for roller bearings comprising a strip of sheet metal having one longitudinal edge portion thereof continuous and a plurality of parallel spacing members integral with said edge portion, said spacing member having lateral wings integral therewith at their free ends, said strip being bent double along longitudinal lines and being bent along transverse lines into an annular form.

6. In a roller bearing, the combination of an inner bearing ring having an exterior circumferential ridge, bearing rollers cooperating with the exterior surface of said bearing ring, each of said bearing rollers having a neck of reduced diameter between its ends positioned over said ridge of said bearing ring, and an integral retaining member of sheet metal for holding said bearing rollers in their assembled relation on said bearing ring, said retaining member comprising a band encircling said bearing rollers outside of the necks thereof, said band having integral therewith a plurality of spacing members doubled under said band and arranged between said bearing rollers.

7. In a roller bearing, the combination of an inner bearing ring having an exterior circumferential ridge, bearing rollers cooperating with the exterior surface of said bearing ring, each of said bearing rollers having a neck of reduced diameter between its ends positioned over said ridge of said bearing ring, and an integral retaining member of sheet metal for holding said bearing rollers in their assembled relation on said bearing ring, said retaining member comprising a band encircling said bearing rollers outside of the necks thereof, said band having integral therewith a plurality of spacing members doubled under said band and arranged between said bearing rollers, said spacing members being the same distance from the center of said bearing ring as the path of movement of the axes of said bearing rollers.

8. In a roller bearing, the combination of an inner bearing ring having an exterior circumferential ridge, bearing rollers cooperating with the exterior surface of said bearing ring, each of said bearing rollers having a neck of reduced diameter between its ends positioned over said ridge of said bearing ring, and an integral retaining member for holding said bearing rollers in their assembled relation on said bearing ring, said retaining member comprising a plurality of spacing members arranged at the same distance from the center of said bearing ring as the axes of the bearing rollers, said spacing members extending radially outward at one end and then backward, a circular band integral with said backwardly extending end portions of said spacing member and encircling said bearing rollers on the outside of the necks thereof, the end portions of said band being overlapped and detachably secured together.

9. In a roller bearing, the combination of an inner bearing ring having an exterior circumferential ridge, of bearing rollers coöperating with the exterior surface of said bearing ring, each of said bearing rollers having a neck of reduced diameter between its ends positioned over said ridge of said bearing ring, and an integral retaining member of sheet metal for holding said bearing rollers in assembled relation on said bearing ring, said retaining member comprising a circular band encircling said bearing rollers on the outside of the necks thereof, said band having a plurality of spacing members integral therewith, said spacing members being doubled under said band and having integral lateral wings, the adjacent lateral wings of the adjacent spacing members embracing the neck of the bearing roller arranged between said spacing members.

10. In a roller bearing, the combination of an inner bearing ring having an exterior circumferential ridge, bearing rollers coöperating with the exterior surface of said bearing ring, each of said bearing rollers having a neck of reduced diameter between its ends positioned over said ridge of said bearing ring, and a retaining member for retaining said bearing rollers in assembled relation on said bearing ring, said retaining member comprising a circular band encircling said bearing rollers on the outside of the necks thereof, a plurality of spacing members integral at one end with said band, portions of said spacing members being arranged in a circular series inside of said band and spaced therefrom, the adjacent lateral wings of the adjacent spacing members embracing the neck of the bearing roller arranged between said spacing members.

11. In a roller bearing, the combination of bearing rollers having necks of reduced diameter between their ends and an intergral retaining member of sheet metal comprising a circular band encircling said bearing rollers on the outside of the necks thereof, and spacing members arranged in a circular series inside of said band and spaced therefrom, said spacing members fitting between said bearing rollers and holding them in alinement.

Signed at St. Louis, Missouri, this 27th day of February, 1915.

ONESIME E. MICHAUD.

In the presence of—
NEIL D. PRESTON,
M. A. SHELTON.